(12) United States Patent
Rodriguez et al.

(10) Patent No.: US 11,431,581 B2
(45) Date of Patent: Aug. 30, 2022

(54) REALISTIC SIMULATION OF AN INTERNET-OF-THINGS SYSTEM

(71) Applicant: Deutsche Telekom AG, Bonn (DE)

(72) Inventors: Miguel Rodriguez, Bonn (DE); Marco Leppich, Bornheim (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/289,243

(22) PCT Filed: Oct. 31, 2019

(86) PCT No.: PCT/EP2019/079901
§ 371 (c)(1),
(2) Date: Apr. 28, 2021

(87) PCT Pub. No.: WO2020/089426
PCT Pub. Date: May 7, 2020

(65) Prior Publication Data
US 2021/0392051 A1 Dec. 16, 2021

(30) Foreign Application Priority Data
Nov. 2, 2018 (EP) .................................... 18204168

(51) Int. Cl.
*G06F 15/173* (2006.01)
*H04L 41/14* (2022.01)
(Continued)

(52) U.S. Cl.
CPC .......... *H04L 41/145* (2013.01); *H04L 41/147* (2013.01); *H04L 67/12* (2013.01); *G16Y 40/40* (2020.01)

(58) Field of Classification Search
CPC ...... H04L 41/145; H04L 41/147; H04L 67/12
See application file for complete search history.

(56) References Cited

U.S. PATENT DOCUMENTS

| | | | |
|---|---|---|---|
| 2010/0235007 A1* | 9/2010 | Constien | G06F 1/3203 700/291 |
| 2017/0364612 A1 | 12/2017 | Broodney et al. | |
| 2020/0065123 A1* | 2/2020 | Yang | G06F 9/455 |

FOREIGN PATENT DOCUMENTS

WO    WO 2018128598 A1    7/2018

OTHER PUBLICATIONS

Ezdiani Syarifah, et al., "An IoR Environment for WSN Adaptive QoS", 2015 IEEE International Conference on Data Science and Data Intensive Systems, Dec. 11, 2015, pp. 586-593, IEEE, Piscataway, New Jersey, USA, XP032859484.
(Continued)

*Primary Examiner* — Padma Mundur
(74) *Attorney, Agent, or Firm* — Leydig, Voit & Mayer, Ltd.

(57) ABSTRACT

A method for simulation of behavior and/or performance of an internet-of-things system uses an internet-of-things simulation environment. The simulated internet-of-things system includes at least a plurality of simulated internet-of-things communication devices in a communication network providing radio coverage in a predetermined geographical area. Via transmission of internet-of-things payload data between the simulated internet-of-things communication devices and the communication network, the simulated internet-of-things system provides a simulated internet-of-things service.

7 Claims, 1 Drawing Sheet

(51) Int. Cl.
*H04L 41/147* (2022.01)
*H04L 67/12* (2022.01)
*G16Y 40/40* (2020.01)

(56) References Cited

OTHER PUBLICATIONS

Kecskemeti Gabor, et al., "Modelling and Simulation Challenges in Internet of Things", IEEE Cloud Computing, Jan. 1, 2017, pp. 62-69, vol. 4, No. 1, IEEE, Piscataway, New Jersey, USA, XP011642840.

* cited by examiner

REALISTIC SIMULATION OF AN INTERNET-OF-THINGS SYSTEM

CROSS-REFERENCE TO PRIOR APPLICATIONS

This application is a U.S. National Phase Application under 35 U.S.C. § 371 of International Application No. PCT/EP2019/079901, filed on Oct. 31, 2019, and claims benefit to European Patent Application No. EP 18204168.1, filed on Nov. 2, 2018. The International Application was published in English on May 7, 2020 as WO 2020/089426 A1 under PCT Article 21(2).

FIELD

The present invention relates to a method for a simulation, especially a realistic simulation, of the behavior and/or the performance of an internet-of-things system and/or for determining at least one performance indicator of a simulated internet-of-things system, using an internet-of-things simulation environment, the simulated internet-of-things system comprising at least a plurality of simulated internet-of-things communication devices in a communication network providing radio coverage in a predetermined geographical area.

Furthermore, the present invention relates to a system for a simulation, especially a realistic simulation, of the behavior and/or the performance of an internet-of-things system and/or for determining at least one performance indicator of a simulated internet-of-things system, using an internet-of-things simulation environment, the simulated internet-of-things system comprising at least a plurality of simulated internet-of-things communication devices in a communication network providing radio coverage in a predetermined geographical area.

Additionally, the present invention relates to a simulation node of an internet-of-things simulation environment or of a system for a simulation, especially a realistic simulation, of the behavior and/or the performance of an internet-of-things system and/or for determining at least one performance indicator of a simulated internet-of-things system, using an internet-of-things simulation environment, the simulated internet-of-things system comprising at least a plurality of simulated internet-of-things communication devices in a communication network providing radio coverage in a predetermined geographical area.

Furthermore, the present invention relates to an internet-of-things system and to internet-of-things communication devices of an internet-of-things system, wherein the internet-of-things system comprises at least a plurality of simulated internet-of-things communication devices in a communication network providing radio coverage in a predetermined geographical area.

Additionally, the present invention relates to a program comprising a computer readable program code, and to a computer-readable medium comprising instructions which when executed help to perform an inventive method.

BACKGROUND

Internet-of-things (IoT) and/or machine-to-machine (M2M) communication refers to systems typically comprising a plurality of devices or communication devices—so-called internet-of-things devices or internet-of-things communication devices—having typically network connectivity enabling the internet-of-things devices to collect, transmit, receive and/or exchange data regarding managed assets. The data are able to be used either in a central or (at least with regard to the often geographically rather dispersed internet-of-things communication devices) centralized entity or server node, or transmitted, from such centralized entity or server node, towards client devices, as part of a service or communication service (internet-of-things service) associated to the internet-of-things system. Often, internet-of-things devices are only optionally associated with a user, and instead typically represent a physical object and/or monitor its behavior, such as by using embedded sensors and electronics.

When setting up or designing an internet-of-things system that comprises at least a plurality of internet-of-things communication devices in a (typically existing) communication network providing radio coverage in a predetermined geographical area, a huge choice of different implementation possibilities typically exist. This is due to the possibility to use, in order to actually set up the internet-of-things system, many hundreds if not many thousands of different possible hardware alternatives regarding, typically, each and every module or component of the internet-of-things communication devices—such as, e.g., the types of sensors, actuators, microcontroller units, chipsets, communication modules, battery units or configurations thereof, and power units. This huge choice, typically at the level of each one of these hardware components, creates an increased number of different possibilities or different combinations how to implement such an internet-of-things system, and, hence, the need to invest substantially in the design process and the process to define a configuration of the internet-of-things communication devices that is viable in practice, i.e. in a real-life environment.

SUMMARY

In an exemplary embodiment, the present invention provides a method for simulation of behavior and/or performance of an internet-of-things system using an internet-of-things simulation environment. The simulated internet-of-things system comprises at least a plurality of simulated internet-of-things communication devices in a communication network providing radio coverage in a predetermined geographical area. Via transmission of internet-of-things payload data between the simulated internet-of-things communication devices and the communication network, the simulated internet-of-things system provides a simulated internet-of-things service. The method comprises: in a first step, for at least one specific type of a plurality of different types of internet-of-things communication devices, behavior of the at least one specific type of internet-of-things communication device is determined and/or simulated, and corresponding performance data is stored in a database of the internet-of-things simulation environment; in a second step, subsequent to the first step, the simulated internet-of-things system is selected or determined via selecting at least one specific type of internet-of-things communication device from the plurality of different types of internet-of-things communication devices and via selecting both at least one specific type of a plurality of different communication network access possibilities, and at least one specific type of a plurality of different communication profiles; and in a third step, subsequent to or at least partly during the second step, and regarding the simulated internet-of-things system selected or determined in the second step, at least part of the behavior and/or the performance is simulated, by the internet-of-things simulation environment, using the performance data stored in the database. The behavior and/or the performance of the selected or determined simulated internet-of-things system corresponds to at least one out of the following: expected battery lifetime of the simulated internet-of-things communication devices of the simulated internet-of-things system; source of battery power consumption within a simulated internet-of-things communication device and/or its percentage of total battery power consumption; or total uplink and/or downlink payload data generated and its suitability to be transmitted to and/or from the communication network.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
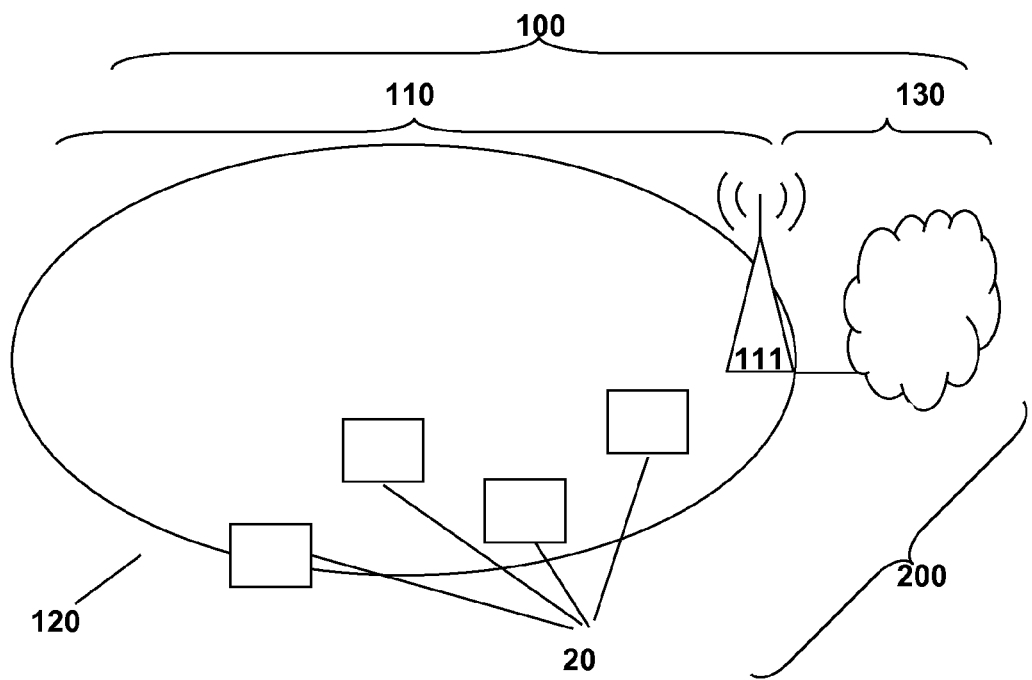
FIG. 1 schematically illustrates an internet-of-things system comprising a communication network, as well as a plurality of internet-of-things communication devices.

Exemplary embodiments of the present invention provide a method, a system for a simulation, especially a realistic simulation, a simulation node, an internet-of-things system as well as internet-of-things communication devices for a simulation, especially a realistic simulation, of the behavior and/or the performance of an internet-of-things system and/or for determining at least one performance indicator of a simulated internet-of-things system; wherein via the simulation, especially the realistic simulation, of at least one aspect or aspects of the internet-of-things system, or of its internet-of-things communication devices, the design process and/or the process to define a configuration of the internet-of-things communication devices that is technically viable is able to be performed more quickly and requiring less resources. Additionally, exemplary embodiments of the present invention provide a program comprising a computer readable program code, and to a computer-readable medium comprising instructions which when executed help to perform an inventive method.

In an exemplary embodiment, the present invention provides a method for a realistic simulation of the behavior and/or the performance of an internet-of-things system and/or for determining at least one performance indicator of a simulated internet-of-things system, using an internet-of-things simulation environment, the simulated internet-of-things system comprising at least a plurality of simulated internet-of-things communication devices in a communication network providing radio coverage in a predetermined geographical area, and—via transmission of internet-of-things payload data from the internet-of-things communication devices, respectively, to the communication network and/or from the communication network to the internet-of-things communication devices, respectively—the internet-of-things system provides a simulated internet-of-things service, the method comprising the following steps:

in a first step, for at least one specific type of a plurality of different types of internet-of-things communication devices, the behavior of the specific type of internet-of-things communication devices is determined and/or simulated, and corresponding performance data stored in a database of or assigned to the internet-of-things simulation environment, in a second step, subsequent to the first step, the simulated internet-of-things system is selected or determined via selecting at least one specific type of internet-of-things communication devices from the plurality of different types of internet-of-things communication devices, and via selecting both at least one specific type of a plurality of different communication network access possibilities, and at least one specific type of a plurality of different communication profiles, in a third step, subsequent to or at least partly during the second step, and regarding the internet-of-things system selected or determined in the second step, the at least part of the behavior and/or the performance is realistically simulated and/or the at least one performance indicator is determined, by the internet-of-things simulation environment, using the performance data stored in the database of or assigned to the internet-of-things simulation environment.

In an exemplary embodiment, the present invention further provides a method for a simulation of the behavior and/or the performance of an internet-of-things system, using an internet-of-things simulation environment, the simulated internet-of-things system comprising at least a plurality of simulated internet-of-things communication devices in a communication network providing radio coverage in a predetermined geographical area, and—via transmission of internet-of-things payload data between the internet-of-things communication devices, respectively, and the communication network—the internet-of-things system provides a simulated internet-of-things service, the method comprising the following steps:

in a first step, for at least one specific type of a plurality of different types of internet-of-things communication devices, the behavior of the specific type of internet-of-things communication devices is determined and/or simulated, and corresponding performance data stored in a database of the internet-of-things simulation environment, in a second step, subsequent to the first step, the simulated internet-of-things system is selected or determined via selecting at least one specific type of internet-of-things communication devices from the plurality of different types of internet-of-things communication devices, and via selecting both at least one specific type of a plurality of different communication network access possibilities, and at least one specific type of a plurality of different communication profiles, in a third step, subsequent to or at least partly during the second step, and regarding the internet-of-things system selected or determined in the second step, the at least part of the behavior and/or the performance is simulated, by the internet-of-things simulation environment, using the performance data stored in the database of or assigned to the internet-of-things simulation environment, wherein the behavior and/or the performance of the selected or determined internet-of-things system corresponds to at least one out of the following:

the expected battery lifetime of the internet-of-things communication devices of the simulated internet-of-things system, the source of battery power consumption within the internet-of-things communication device, and/or its percentage to the total battery power consumption, the total uplink and/or downlink payload data generated, and its suitability to be transmitted to and/or from the communication network.

According to the present invention, it is advantageously possible to easily define an internet-of-things system, comprising simulated internet-of-things communication devices in a specific communication network, and to derive, from the realistic simulation, a realistic behavior and/or performance of the simulated internet-of-things system and/or at least one realistic performance indicator of the simulated internet-of-things system. Hence, according to the present invention, it is advantageously possible to very quickly and very realistically obtain an estimation of the behavior and/or of the performance of the simulated internet-of-things system and/or of the at least one realistic performance indicator, and, as a consequence, to be able to comparatively easily and quickly be able to modify the system's configuration (such as, by modifying characteristics of hardware components of the internet-of-things system and/or internet-of-things communication services) in order to optimize the estimated (i.e. realistically simulated) behavior and/or performance of the simulated internet-of-things system and/or the estimated performance indicators. One especially important performance indicator relates to the estimated battery lifetime of the internet-of-things communication devices of the simulated internet-of-things system.

According to the present invention, the behavior and/or the performance of the simulated internet-of-things system and/or the performance indicators are simulated (or estimated) using an internet-of-things simulation environment, typically comprising a plurality of simulation nodes. The simulation environment especially comprises or has access to a database, especially comprising a multitude of data relevant for assessing and/or estimating the behavior and/or the performance of single internet-of-things communication devices according to different configurations. The simulated internet-of-things system comprises at least a plurality of simulated internet-of-things communication devices, and the simulation assumes that these internet-of-things communication devices are located in the coverage area of a communication network. It is especially advantageous according to the present invention that not only the use of an arbitrary (or generic) communication network (providing radio coverage in a predetermined geographical area) is able to be assumed but that also the use of a specific (already existing) communication network (providing likewise radio coverage in a predetermined geographical area in a specific manner) is able to be assumed as the host communication network for the simulated internet-of-things communication devices of the simulated internet-of-things system.

Typically in an internet-of-things system, via transmission of internet-of-things payload data from the internet-of-things communication devices, respectively, to the communication network and/or from the communication network to the internet-of-things communication devices, respectively, the internet-of-things system is able to provide an internet-of-things service (i.e. at least one internet-of-things service). Likewise according to the present invention, the internet-of-things simulation environment simulates the internet-of-things system (comprising the internet-of-things communication devices) and is able to simulate and/or to provide an internet-of-things service (i.e. at least one internet-of-things service). In the context of the present invention, and in this description, the terms simulated internet-of-things system and internet-of-things system (as well as the terms simulated internet-of-things (communication) device(s) and internet-of-things (communication) device(s)) are used rather synonymously; it is evident that the simulation environment, while simulating a (simulated) internet-of-things system, comprises (only) a representation (in the sense of a data structure, not physically embodied) of a—potential, realized in future, or existing—real-world internet-of-things system that is being simulated by or in the simulation environment and/or by or in its respective simulation node.

The data used for this simulation (i.e. in order for this simulation being a realistic simulation) regarding the behavior and/or the performance and/or the performance indicator—especially regarding the expected battery lifetime or the (source of) battery power consumption of components of the system—are simulated data or real-world measurement data (i.e. obtained by measurements using physical objects) or both simulated data and real-world measurement data of a multitude of different (hardware) system components used in internet-of-things systems, especially components of internet-of-things communication devices. Hence, according to the present invention, the method comprises a preparatory step (first step) during which, for at least one specific type of a plurality of different types of internet-of-things communication devices, the behavior of the specific type of internet-of-things communication devices is determined and/or simulated, and corresponding performance data stored in the database of or assigned to the internet-of-things simulation environment.

In a second step, subsequent to the first step, the simulated internet-of-things system is selected or determined via selecting at least one specific type of internet-of-things communication devices from the plurality of different types of internet-of-things communication devices, and via selecting both at least one specific type of a plurality of different communication network access possibilities, and at least one specific type of a plurality of different communication profiles. Hence, during the second step, the configuration of the internet-of-things system to be simulated is defined.

In a third step, subsequent to or at least partly during the second step, and regarding the internet-of-things system selected or determined in the second step, the at least part of the behavior and/or the performance is realistically simulated and/or the at least one performance indicator is determined, by the internet-of-things simulation environment, using the performance data stored in the database of or assigned to the internet-of-things simulation environment. It is advantageously possible according to the present invention that the third step provides a realistic assessment or realistic estimates for the behavior and/or the performance of the simulated internet-of-things system defined in the second step and/or its performance indicators. Typically, these assessments or estimates then lead, potentially, to the need to modify the configuration of the internet-of-things system (i.e. conducting, after having conducted the second step initially, the second step once more (further iteration thereof), thereby selecting at least one specific type of internet-of-things communication devices (typically a further (different) specific type of internet-of-things communication devices compared to the specific type of internet-of-things communication devices selected in the first iteration of the second step) from the plurality of different types of internet-of-things communication devices), and to conduct also the third step once more (further iteration thereof), typically leading to further (i.e. different) assessments or estimates for the behavior and/or the performance of the simulated internet-of-things system defined in the iterated second step and/or its performance indicators.

According to the present invention, different types of internet-of-things communication devices may be internet-of-things communication devices having:
- different types of sensors and/or of actuators and/or of microcontroller units and/or of chipsets and/or of communication modules and/or
- different types of battery units or configurations thereof and/or
- different types of hardware power units.

Thereby, it is advantageously possible, to provide a multitude of different types of internet-of-things communication devices to be potentially simulated, i.e. used in internet-of-things systems configured according to the present invention.

According to a further embodiment of the present invention, the behavior of the specific type of internet-of-things communication devices, and the performance and/or the performance indicator of the simulated internet-of-things system, is determined and/or simulated taking into consideration at least one out of the following:
- different radio coverage quality levels in a predetermined geographical area where at least a part of the simulated internet-of-things communication devices finds itself,
- different parts or slices of the communication network and/or different access technologies provided by the communication network,
- different network access possibilities,
- different communication profiles, especially regarding different payload transmission pattern and/or different used protocols and/or different power saving features,
- the actual network coverage of the communication network in the predetermined geographical area,
- different vertical industries of internet-of-things applications or services having typical application profiles, especially with respect to mobility requirements, communication frequency requirements (i.e. the requirements regarding the frequency of the exchange of internet-of-things payload data), latency requirements and/or security requirements
- different rules regarding communication of internet-of-things devices with the communication network and/or regarding the ability to communicate.

Thereby, it is advantageously possible according to the present invention to provide realistic overall values or estimates regarding the behavior and/or the performance of the simulated internet-of-things system and/or its performance indicators, i.e. the behavior and/or the performance and/or the performance indicators of different possible hardware components (especially of internet-of-things communication devices) are determined and/or simulated for a multitude of different situations such as different radio coverage quality levels and/or for different access technologies provided by a specific communication network and/or different access possibilities.

Additionally, it is advantageously possible according to the present invention that the compliance with rules regarding viable solutions in the setup of internet-of-things systems is checked. Examples of such rules are, e.g., related to power saving features, especially 3GPP power saving features, that are able to be integrated or realized within the internet-of-things system.

According to still a further embodiment of the present invention, the behavior and/or the performance and/or the performance indicator of the selected or determined internet-of-things system corresponds to at least one out of the following:
- the expected battery lifetime of the internet-of-things communication devices of the simulated internet-of-things system, especially depending on the actual coverage level such internet-of-things communication devices are experiencing,
- the source of battery power consumption within the internet-of-things communication device, and/or its percentage to the total battery power consumption,
- the total uplink and/or downlink payload data generated, and its suitability to be transmitted to and/or from the communication network.

Hence, according to the present invention, it is advantageously possible to provide sound estimates regarding the battery lifetime of the internet-of-things communication devices of the simulated internet-of-things system.

According to the present invention, in a fourth step, subsequent to or at least partly during the second and/or third step, a graphical user interface may be displayed, wherein the displayed graphical user interface provides optimization options for the at least one specific type of internet-of-things communication devices and/or for the specific type of network access possibilities and/or for the specific type of different communication profiles.

According to the present invention, it is thereby advantageously possible to flexibly and comparatively easily modify the configuration of the simulated internet-of-things system, and thereby conduct the second and third step repeatedly in order to optimize the configuration of the simulated internet-of-things system.

The present invention also relates to a system for a realistic simulation of the behavior and/or the performance of an internet-of-things system and/or for determining at least one performance indicator of a simulated internet-of-things system, using an internet-of-things simulation environment,
the simulated internet-of-things system comprising at least a plurality of simulated internet-of-things communication devices in a communication network providing radio coverage in a predetermined geographical area, and—via transmission of internet-of-things payload data from the internet-of-things communication devices, respectively, to the communication network and/or from the communication network to the internet-of-things communication devices, respectively—the internet-of-things system provides a simulated internet-of-things service,
the system being configured such that:
- for at least one specific type of a plurality of different types of internet-of-things communication devices, the behavior of the specific type of internet-of-things communication devices is determined and/or simulated, and corresponding performance data stored in a database of or assigned to the internet-of-things simulation environment,
- the simulated internet-of-things system is selected or determined via configuring at least one specific type of internet-of-things communication devices from the plurality of different types of internet-of-things communication devices, and via selecting both at least one specific type of a plurality of different network access possibilities, and at least one specific type of a plurality of different communication profiles, regarding the selected or determined internet-of-things system, the at least part of the behavior and/or the performance is realistically simulated and/or the at least one performance indicator is determined, by the internet-of-things simulation environment, using the performance data stored in the database of or assigned to the internet-of-things simulation environment.

The present invention furthermore additionally relates to a system for a simulation of the behavior and/or the performance of an internet-of-things system, using an internet-of-things simulation environment, the simulated internet-of-things system comprising at least a plurality of simulated internet-of-things communication devices in a communication network providing radio coverage in a predetermined geographical area, and—via transmission of internet-of-things payload data between the internet-of-things communication devices, respectively, and the communication network—the internet-of-things system provides a simulated internet-of-things service, the system being configured such that:

for at least one specific type of a plurality of different types of internet-of-things communication devices, the behavior of the specific type of internet-of-things communication devices is determined and/or simulated, and corresponding performance data stored in a database of the internet-of-things simulation environment, the simulated internet-of-things system is selected or determined via configuring at least one specific type of internet-of-things communication devices from the plurality of different types of internet-of-things communication devices, and via selecting both at least one specific type of a plurality of different network access possibilities, and at least one specific type of a plurality of different communication profiles, regarding the selected or determined internet-of-things system, the at least part of the behavior and/or the performance is simulated, by the internet-of-things simulation environment, using the performance data stored in the database of or assigned to the internet-of-things simulation environment, wherein the behavior and/or the performance of the selected or determined internet-of-things system corresponds to at least one out of the following:

the expected battery lifetime of the internet-of-things communication devices of the simulated internet-of-things system, the source of battery power consumption within the internet-of-things communication device, and/or its percentage to the total battery power consumption, the total uplink and/or downlink payload data generated, and its suitability to be transmitted to and/or from the communication network.

Thereby, a system (or internet-of-things simulation environment) is provided to perform the realistic simulation of the behavior and/or the performance of the internet-of-things system and/or for determining the at least one performance indicator of the simulated internet-of-things system according to the present invention.

The present invention further relates to a simulation node of an internet-of-things simulation environment or of a system for a realistic simulation of the behavior and/or the performance of an internet-of-things system and/or for determining at least one performance indicator of a simulated internet-of-things system, using an internet-of-things simulation environment, the simulated internet-of-things system comprising at least a plurality of simulated internet-of-things communication devices in a communication network providing radio coverage in a predetermined geographical area, and—via transmission of internet-of-things payload data from the internet-of-things communication devices, respectively, to the communication network and/or from the communication network to the internet-of-things communication devices, respectively—the internet-of-things system provides a simulated internet-of-things service, the simulation node being configured such that:

for at least one specific type of a plurality of different types of internet-of-things communication devices, the behavior of the specific type of internet-of-things communication devices is determined and/or simulated, and corresponding performance data stored in a database of or assigned to the internet-of-things simulation environment, the simulated internet-of-things system is selected or determined via selecting at least one specific type of internet-of-things communication devices from the plurality of different types of internet-of-things communication devices, and via selecting both at least one specific type of a plurality of different network access possibilities, and at least one specific type of a plurality of different communication profiles, regarding the selected or determined internet-of-things system, the at least part of the behavior and/or the performance is realistically simulated and/or the at least one performance indicator is determined, by the internet-of-things simulation environment, using the performance data stored in the database of or assigned to the internet-of-things simulation environment.

The present invention further additionally relates to a simulation node of an internet-of-things simulation environment or of a system for a simulation of the behavior and/or the performance of an internet-of-things system, using an internet-of-things simulation environment, the simulated internet-of-things system comprising at least a plurality of simulated internet-of-things communication devices in a communication network providing radio coverage in a predetermined geographical area, and—via transmission of internet-of-things payload data between the internet-of-things communication devices, respectively, and the communication network—the internet-of-things system provides a simulated internet-of-things service, the simulation node being configured such that:

for at least one specific type of a plurality of different types of internet-of-things communication devices, the behavior of the specific type of internet-of-things communication devices is determined and/or simulated, and corresponding performance data stored in a database of the internet-of-things simulation environment, the simulated internet-of-things system is selected or determined via selecting at least one specific type of internet-of-things communication devices from the plurality of different types of internet-of-things communication devices, and via selecting both at least one specific type of a plurality of different network access possibilities, and at least one specific type of a plurality of different communication profiles, regarding the selected or determined internet-of-things system, the at least part of the behavior and/or the performance is simulated, by the internet-of-things simulation environment, using the performance data stored in the database of or assigned to the internet-of-things simulation environment, wherein the behavior and/or the performance of the selected or determined internet-of-things system corresponds to at least one out of the following:

the expected battery lifetime of the internet-of-things communication devices of the simulated internet-of-things system, the source of battery power consumption within the internet-of-things communication device, and/or its percentage to the total battery power consumption, the total uplink and/or downlink payload data generated, and its suitability to be transmitted to and/or from the communication network.

Thereby, it is advantageously possible according to the present invention that, via the simulation node, or rather via a plurality of simulation nodes, the internet-of-things simulation environment or the system for a realistic simulation of an internet-of-things system can be used to simulate a plurality of internet-of-things systems simultaneously, especially by using one and the same database of or assigned to the internet-of-things simulation environment.

The present invention further relates to an internet-of-things system comprising at least a plurality of simulated internet-of-things communication devices in a communication network providing radio coverage in a predetermined geographical area, and—via transmission of internet-of-things payload data from the internet-of-things communication devices, respectively, to the communication network and/or from the communication network to the internet-of-things communication devices, respectively—the internet-of-things system provides a simulated internet-of-things service, the internet-of-things system being defined or configured in order to obtain a realistic performance or fulfilling a predetermined performance indicator via performing the following steps:

in a first step, for at least one specific type of a plurality of different types of internet-of-things communication devices, the behavior of the specific type of internet-of-things communication devices is determined and/or simulated, and corresponding performance data stored in a database of or assigned to the internet-of-things simulation environment, in a second step, subsequent to the first step, the simulated internet-of-things system is selected or determined via selecting at least one specific type of internet-of-things communication devices from the plurality of different types of internet-of-things communication devices, and via selecting both at least one specific type of a plurality of different network access possibilities, and at least one specific type of a plurality of different communication profiles, in a third step, subsequent to or at least partly during the second step, and regarding the internet-of-things system selected or determined in the second step, the at least part of the behavior and/or the performance is realistically simulated and/or the at least one performance indicator is determined, by the internet-of-things simulation environment, using the performance data stored in the database of or assigned to the internet-of-things simulation environment.

The present invention additionally further relates to an internet-of-things system comprising at least a plurality of simulated internet-of-things communication devices in a communication network providing radio coverage in a predetermined geographical area, and via transmission of internet-of-things payload data between the internet-of-things communication devices, respectively, and the communication network—the internet-of-things system provides a simulated internet-of-things service, the internet-of-things system being defined or configured in order to obtain a performance via performing the following steps:

in a first step, for at least one specific type of a plurality of different types of internet-of-things communication devices, the behavior of the specific type of internet-of-things communication devices is determined and/or simulated, and corresponding performance data stored in a database of the internet-of-things simulation environment, in a second step, subsequent to the first step, the simulated internet-of-things system is selected or determined via selecting at least one specific type of internet-of-things communication devices from the plurality of different types of internet-of-things communication devices, and via selecting both at least one specific type of a plurality of different network access possibilities, and at least one specific type of a plurality of different communication profiles, in a third step, subsequent to or at least partly during the second step, and regarding the internet-of-things system selected or determined in the second step, the at least part of the behavior and/or the performance is simulated, by the internet-of-things simulation environment, using the performance data stored in the database of or assigned to the internet-of-things simulation environment, wherein the behavior and/or the performance of the selected or determined internet-of-things system corresponds to at least one out of the following:

the expected battery lifetime of the internet-of-things communication devices of the simulated internet-of-things system, the source of battery power consumption within the internet-of-things communication device, and/or its percentage to the total battery power consumption, the total uplink and/or downlink payload data generated, and its suitability to be transmitted to and/or from the communication network.

Thereby, it is advantageously possible according to the present invention to provide for a comparatively easy and quick generation (or definition) of internet-of-things systems, or rather configurations of viable internet-of-things systems that are able to deliver—in practice, i.e. in a real-world environment—the behavior and/or the performance and/or the performance indicator as simulated using the internet-of-things simulation environment.

Furthermore, the present invention also relates to an internet-of-things communication devices of an internet-of-things system in a communication network providing radio coverage in a predetermined geographical area, and—via transmission of internet-of-things payload data from the internet-of-things communication devices, respectively, to the communication network and/or from the communication network to the internet-of-things communication devices, respectively—an internet-of-things service is provided, the internet-of-things communication devices being defined or configured in order to obtain a realistic performance or fulfilling a predetermined performance indicator via performing the following steps:

in a first step, for at least one specific type of a plurality of different types of internet-of-things communication devices, the behavior of the specific type of internet-of-things communication devices is determined and/or simulated, and corresponding performance data stored in a database of or assigned to the internet-of-things simulation environment, in a second step, subsequent to the first step, the simulated internet-of-things system is selected or determined via selecting at least one specific type of internet-of-things communication devices from the plurality of different types of internet-of-things communication devices, and via selecting both at least one specific type of a plurality of different network access possibilities, and at least one specific type of a plurality of different communication profiles, in a third step, subsequent to or at least partly during the second step, and regarding the internet-of-things system selected or determined in the second step, the at least part of the behavior and/or the performance is realistically simulated and/or the at least one performance indicator is determined, by the internet-of-things simulation environment, using the performance data stored in the database of or assigned to the internet-of-things simulation environment.

Furthermore, the present invention additionally relates to internet-of-things communication devices of an internet-of-things system in a communication network providing radio coverage in a predetermined geographical area, and—via transmission of internet-of-things payload data between the internet-of-things communication devices, respectively, and the communication network—an internet-of-things service is provided, the internet-of-things communication devices being defined or configured in order to obtain a performance via performing the following steps:

in a first step, for at least one specific type of a plurality of different types of internet-of-things communication devices, the behavior of the specific type of internet-of-things communication devices is determined and/or simulated, and corresponding performance data stored in a database of the internet-of-things simulation environment, in a second step, subsequent to the first step, the simulated internet-of-things system is selected or determined via selecting at least one specific type of internet-of-things communication devices from the plurality of different types of internet-of-things communication devices, and via selecting both at least one specific type of a plurality of different network access possibilities, and at least one specific type of a plurality of different communication profiles, in a third step, subsequent to or at least partly during the second step, and regarding the internet-of-things system selected or determined in the second step, the at least part of the behavior and/or the performance is simulated, by the internet-of-things simulation environment, using the performance data stored in the database of or assigned to the internet-of-things simulation environment, wherein the behavior and/or the performance of the selected or determined internet-of-things system corresponds to at least one out of the following:

the expected battery lifetime of the internet-of-things communication devices of the simulated internet-of-things system, the source of battery power consumption within the internet-of-things communication device, and/or its percentage to the total battery power consumption, the total uplink and/or downlink payload data generated, and its suitability to be transmitted to and/or from the communication network.

Thereby, it is advantageously possible according to the present invention to provide for a comparatively easy and quick generation (or definition) of internet-of-things communication devices, or rather configurations of viable internet-of-things communication devices that are able to deliver—in practice, i.e. in a real-world environment—the behavior and/or the performance and/or the performance indicator as simulated using the internet-of-things simulation environment.

Furthermore, the present invention relates to a program comprising a computer readable program code which, when executed on a computer or on an internet-of-things simulation environment or on a simulation node of an internet-of-things simulation environment, causes the computer or the internet-of-things simulation environment or the simulation node of the internet-of-things simulation environment to perform a method according to the present invention.

Additionally, the present invention relates to a computer-readable medium comprising instructions which when executed on a computer or on an internet-of-things simulation environment or on a simulation node of an internet-of-things simulation environment, causes the computer or the internet-of-things simulation environment or the simulation node of the internet-of-things simulation environment to perform a method according to the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to exemplary embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

According to the present invention, an improved method for a realistic simulation of the behavior and/or the performance of an internet-of-things system and/or for determining at least one performance indicator of a simulated internet-of-things system, using an internet-of-things simulation environment is provided.

In FIG. 1, a (real-world or physical) internet-of-things system 200 is schematically shown, comprising a (physical) communication network 100 as well as a plurality of (real-world or physical) internet-of-things communication devices 20. The communication network 100 is typically a cellular communication network 100, such as a public land mobile network, and is schematically represented as comprising an access network 110, and a core network 130. Exemplarily, a base station entity 111 is shown as part of the access network 110 of the communication network 100. Furthermore, a geographical area 120 is schematically shown in FIG. 1, this geographical area 120 can be understood as either corresponding to a radio cell of the access network of the communication network 100, especially the radio cell 120 being served by the base station entity 111, or, alternatively, the geographical area 120 can be understood as corresponding to the total geographical area of radio coverage (typically comprising a multitude of different radio cells, in turn being served by a multitude of different base station entities) of the communication network 100. In any case, the internet-of-things communication devices 20 of a real-world (or physical) internet-of-things system 200 are "in" the communication network 100 (or connected to the communication network 100), i.e. there is, at least intermittently, a radio communication link operational between the internet-of-things communication devices 20 and the communication network 100 (typically in the form of the corresponding access network 110, using a base station entity 111) for the transmission of internet-of-things payload data from the internet-of-things communication devices 20, respectively, to the communication network 100 and/or from the communication network 100 to the internet-of-things communication devices 20, respectively.

Figure 2:
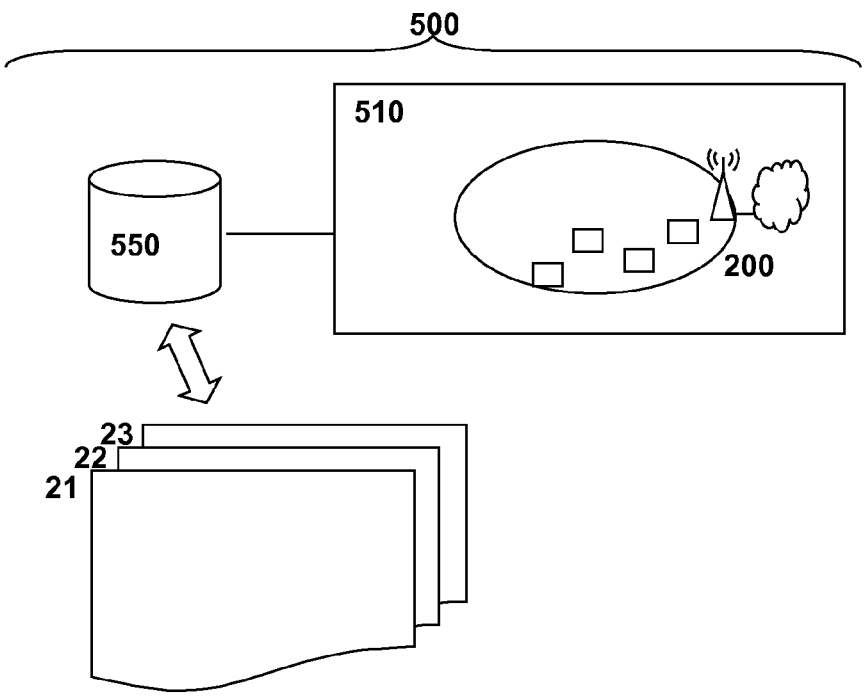
FIG. 2 schematically illustrates an internet-of-things simulation environment or a system for a realistic simulation of the behavior and/or the performance of an internet-of-things system and/or for determining at least one performance indicator of a simulated internet-of-things system.

According to the present invention, at least aspects (at least a part of the behavior and/or the performance and/or at least a part of the performance indicators) of a physical internet-of-things system 200 is realistically simulated using an internet-of-things simulation environment, simulating a simulated internet-of-things system 200. In FIG. 2, such an internet-of-things simulation environment 500 (or a system 500 for a realistic simulation of the behavior and/or the performance of an internet-of-things system and/or for determining at least one of its performance indicators) is schematically shown, comprising a simulation node 510 and a database 550 being either part of the internet-of-things simulation environment 500 (or part of the simulation node 510) or being assigned (or being able to be accessed by) the internet-of-things simulation environment 500 or the simulation node 510.

The database 550 of or assigned to the internet-of-things simulation environment 500 comprises simulated data or real-world measurement data (i.e. obtained by measurements using physical objects) or both simulated data and real-world measurement data of a multitude of different (hardware) system components used in internet-of-things systems 200, especially components of internet-of-things communication devices 20. During the first step according to the present invention (preparatory step), the behavior of each of the plurality of types of internet-of-things communication devices 20 is determined and/or simulated, and corresponding performance data stored in the database 550 of or assigned to the internet-of-things simulation environment 500.

As in an actual internet-of-things system 200, it is possible to use many different internet-of-things communication devices 20—due to the possibility to use many hundreds if not many thousands of different possible hardware alternatives regarding, typically, each and every module or component of the internet-of-things communication devices 20—a multitude of different types 21, 22, 23 of internet-of-things communication devices 20 are able to be used in the internet-of-things system 200 to be simulated. Accordingly, the database 550 comprises corresponding performance data for each one of the different types 21, 22, 23 of internet-of-things communication devices 20 that are possible to be simulated by the internet-of-things simulation environment 500. This means that for each different hardware configuration of an internet-of-things communication device 20 (i.e. for each different type 21, 22, 23 of internet-of-things communication device 20), the database 550 comprises a set of simulation or performance data, represented in FIG. 2 via a different sheet representation for each one of the three exemplarily represented types 21, 22, 23 of internet-of-things communication device 20.

Via using the content of the database 550 of or assigned to the internet-of-things simulation environment 500, it is possible, according to the present invention, to realistically simulate the behavior and/or the performance of the (simulated) internet-of-things system 200 and/or determine at least one performance indicator of the (simulated) internet-of-things system 200. After the preparatory step (first step), in the second step, the simulated internet-of-things system 200 is selected (or defined or determined) via selecting at least one specific type of internet-of-things communication devices 20 out of the plurality of different types 21, 22, 23 of internet-of-things communication devices 20, i.e. by defining, in essence, the hardware configuration of the internet-of-things device 20 to be simulated.

According to the present invention, besides defining (or selecting or determining) the hardware configuration of the internet-of-things device 20, the following may also be defined (or selected or determined) during the second step,
 at least one specific type of a plurality of different communication network access possibilities (NarrowBand IoT, LTE Category M1 (eMTC), LTE Category 1-5, GSM (2G/EGPRS), 5G, and
 at least one specific type of a plurality of different communication profiles (uplink-centric communication profiles dominated by communication initiated by the internet-of-things devices 20, downlink-centric communication profiles dominated by communication initiated by the communication network 100, as well as the frequency of the exchange of internet-of-things payload data between the internet-of-things devices 20 and the communication network 100, the data volume of such internet-of-things payload data, the used protocols or the like).

In the third step, subsequent to or at least partly during the second step, and regarding the internet-of-things system 200 selected or determined in the second step, the at least part of the behavior and/or the performance is realistically simulated and/or the at least one performance indicator is determined, by the internet-of-things simulation environment 500, using the performance data stored in the database 550 of or assigned to the internet-of-things simulation environment 500.

The different types 21, 22, 23 of internet-of-things communication devices 20 are defined via their different hardware components, i.e. typically different types of sensors and/or of actuators and/or of microcontroller units and/or of chipsets and/or of communication modules, furthermore different types of battery units or configurations thereof and/or different types of hardware power units. Typically, in a real-world application or use case of an internet-of-things communication device having a specific configuration of hardware components, there is an interaction—regarding the behavior and/or the performance and/or the performance indicators—between the different hardware components leading to different results of, e.g., the source of battery power consumption and, hence, the expected battery lifetime (or other performance indicators) of the considered (configuration of an) internet-of-things communication device.

Hence, for each of those different hardware configurations, performance data are stored in the database 550.

However, not only the hardware configuration (of a considered internet-of-things communication device) might influence the behavior and/or the performance and/or the performance indicators of the internet-of-things communication device, but also other parameters, especially usage parameters, might do that. According to the present invention, the behavior and/or the performance and/or the performance indicator of the internet-of-things system 200 to be simulated (i.e. selected or determined during the second step) may be determined and/or simulated taking into consideration at least one out of the following, but preferably taking into consideration a plurality of the following:

- different radio coverage quality levels in a predetermined geographical area 120 where at least a part of the simulated internet-of-things communication devices 20 finds itself,
- different parts or slices of the communication network 100 and/or different access technologies provided by the communication network 100,
- different network access possibilities,
- different communication profiles, especially regarding different payload transmission pattern and/or different used protocols (such as, e.g., NIDD (Non-IP Data Delivery), MQTT-SN (Message Queuing Telemetry Transport for Sensor Networks), MQTT (Message Queuing Telemetry Transport), TLS (Transport Layer Security), DTLS (Datagram Transport Layer Security), CoAP (Constrained Application Protocol), the use of HTTP TCP (Transport Control Protocol) or UDP (User Datagram Protocol) according to the IPv4 (internet protocol version 4) or IPv6 (internet protocol version 6) protocols), and/or different power saving features,
- the actual network coverage of the communication network 100 in the predetermined geographical area 120,
- different vertical industries of internet-of-things applications or services (such as, e.g., asset tracking, condition monitoring, meters/metering, parking, street lighting, waste management, Agriculture, white goods, object sharing/x-sharing, environmental, smart grid, health) having typical application profiles, especially with respect to mobility requirements, communication frequency requirements, latency requirements and/or security requirements
- different rules regarding communication patterns and frequency thereof for internet-of-things devices 20 with the communication network 100 and/or regarding the ability to communicate, especially in dependency on the used vertical industry.

According to the present invention, it is advantageously possible that the compliance with rules regarding technically viable solutions in the setup of internet-of-things systems is checked. Examples of such rules are, e.g., related to power saving features, especially 3GPP power saving features, that are able to be integrated or realized within the internet-of-things system. Examples of such power saving features include Long Periodic TAU (Tracking Area Update), Enhanced DRX (Discontinued Reception), Power Saving Mode, and Early Release Assistance.

For example, in an uplink-centric application (like, e.g., smart parking, realizing a very regular reporting, or like, e.g., hourly climate report, realizing a regular reporting, or like, e.g., smart metering, realizing an irregular reporting), Long periodic TAU power saving is only beneficial if the reporting interval is above 186 minutes, Enhanced DRX should not be used, and Power Saving Mode as well as Early Release Assistance are possible to be used. Furthermore, in a downlink-centric application realizing a very regular reporting (like, e.g., access control), Long periodic TAU power saving is only beneficial if the reporting interval is above 186 minutes, and Enhanced DRX, Power Saving Mode, as well as Early Release Assistance should not be used; in a downlink-centric application realizing a regular reporting (like, e.g., ventilation actuator), Long periodic TAU power saving is only beneficial if the reporting interval is above 186 minutes, and Enhanced DRX as well as Early Release Assistance are possible to be used, whereas Power Saving Mode should not be used; and in a downlink-centric application realizing a irregular reporting (like, e.g., irrigation actuator), Long periodic TAU power saving is only beneficial if the reporting interval is above 186 minutes, and Enhanced DRX, Power Saving Mode as well as Early Release Assistance are possible to be used.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for using an internet-of-things simulation environment, the method comprising:
   - obtaining performance data for a plurality of configurations of internet-of-things communication devices;
   - storing the obtained performance data for the plurality of configurations of internet-of-things communication devices in a database of the internet-of-things simulation environment;
   - setting up a simulation, wherein setting up the simulation comprises:
     - selecting at least one configuration of an internet-of-things communication device out of the plurality of configurations of internet-of-things communication devices;
     - selecting at least one type of network access possibility out of a plurality of different types of network access possibilities; and selecting at least one type of communication profile out of a plurality of different types of communication profiles; and performing, by the internet-of-things simulation environment, the simulation using the performance data stored in the database to obtain a simulation result regarding at least one simulated internet-of-things communication device having the at least one selected configuration, wherein the simulation result comprises information regarding at least one out of the following:

an expected battery lifetime of the at least one simulated internet-of-things communication device;

a source of battery power consumption for the at least one simulated internet-of-things communication device and/or a percentage of total battery power consumption of the at least one simulated internet-of-things communication device associated with the source of battery power consumption; or uplink and/or downlink payload data associated with at least one simulated internet-of-things communication device;

wherein performing the simulation takes into consideration at least one out of the following:

different radio coverage quality levels in a predetermined geographical area corresponding to simulated internet-of-things communication devices;

different parts or slices of a communication network;

different communication profiles regarding different payload transmission patterns; or different vertical industries of internet-of-things applications or services having application profiles with respect to mobility requirements, communication frequency requirements, latency requirements and/or security requirements.

2. The method according to claim 1, wherein different configurations of internet-of-things communication devices have:

different types of sensors, actuators, microcontrollers, chipsets, and/or communication modules;

different types of battery units or configurations thereof; and/or different types of hardware power units.

3. The method according to claim 1, wherein performing the simulation further takes into consideration at least one out of the following: different access technologies provided by the communication network;

different network access possibilities;

different communication profiles regarding different protocols and/or different power saving features;

actual network coverage of the communication network in the predetermined geographical area; or different rules regarding communication of internet-of-things devices with the communication network and/or regarding the ability to communicate.

4. The method according to claim 1, wherein the expected battery lifetime of the at least one simulated internet-of-things communication device depends on radio coverage experienced by the at least one simulated internet-of-things communication devices.

5. The method according to claim 1, wherein the method further comprises:

displaying a graphical user interface is which provides optimization options for the at least one selected configuration of the internet-of-things communication device, for the at least one selected type of network access possibility, and/or for the at least one selected type of communication profile.

6. A non-transitory computer-readable medium having processor-executable instructions stored thereon for using an internet-of-things simulation environment, wherein the processor-executable instructions, when executed, facilitate performance of the following:

obtaining performance data for a plurality of configurations of internet-of-things communication devices;

storing the obtained performance data for the plurality of configurations of internet-of-things communication devices in a database of the internet-of-things simulation environment;

setting up a simulation, wherein setting up the simulation comprises:

selecting at least one configuration of an internet-of-things communication device out of the plurality of configurations of internet-of-things communication devices;

selecting at least one type of network access possibility out of a plurality of different types of network access possibilities; and selecting at least one type of communication profile out of a plurality of different types of communication profiles; and performing, by the internet-of-things simulation environment, the simulation using the performance data stored in the database to obtain a simulation result regarding at least one simulated internet-of-things communication device having the at least one selected configuration, wherein the simulation result comprises information regarding at least one out of the following:

an expected battery lifetime of the at least one simulated internet-of-things communication device;

a source of battery power consumption for the at least one simulated internet-of-things communication device and/or a percentage of total battery power consumption of the at least one simulated internet-of-things communication device associated with the source of battery power consumption; or uplink and/or downlink payload data associated with at least one simulated internet-of-things communication device;

wherein performing the simulation takes into consideration at least one out of the following:

different radio coverage quality levels in a predetermined geographical area corresponding to simulated internet-of-things communication devices;

different parts or slices of a simulated communication network;

different communication profiles regarding different payload transmission patterns; or different vertical industries of internet-of-things applications or services having application profiles with respect to mobility requirements, communication frequency requirements, latency requirements and/or security requirements.

7. An internet-of-things simulation system, comprising:

a database configured to store obtained performance data for a plurality of configurations of internet-of-things communication devices;

at least one computing node configured to set up a simulation, wherein setting up the simulation comprises:

selecting at least one configuration of an internet-of-things communication device out of the plurality of configurations of internet-of-things communication devices;

selecting at least one type of network access possibility out of a plurality of different types of network access possibilities; and selecting at least one type of communication profile out of a plurality of different types of communication profiles; and wherein the at least one computing node is further configured to perform the simulation using the performance data stored in the database to obtain a simulation result regarding at least one simulated internet-of-things communication device having the at least one selected configuration, wherein the simulation result comprises information regarding at least one out of the following:

an expected battery lifetime of the at least one simulated internet-of-things communication device;

a source of battery power consumption for the at least one simulated internet-of-things communication device and/or a percentage of total battery power consumption of the at least one simulated internet-of-things communication device associated with the source of battery power consumption; or uplink and/or downlink payload data associated with at least one simulated internet-of-things communication device;

wherein performing the simulation takes into consideration at least one out of the following:

different radio coverage quality levels in a predetermined geographical area corresponding to simulated internet-of-things communication devices;

different parts or slices of a simulated communication network;

different communication profiles regarding different payload transmission patterns; or different vertical industries of internet-of-things applications or services having application profiles with respect to mobility requirements, communication frequency requirements, latency requirements and/or security requirements.

* * * * *